(12) United States Patent
Burns et al.

(10) Patent No.: US 8,307,731 B2
(45) Date of Patent: Nov. 13, 2012

(54) TORQUE LIMITING SHAFT AND SPROCKET ASSEMBLY

(75) Inventors: Timothy M. Burns, Eldridge, NY (US); Sankar K. Mohan, Jamesville, NY (US); Anupam Sharma, Brewerton, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 690 days.

(21) Appl. No.: 12/516,830

(22) PCT Filed: Nov. 8, 2007

(86) PCT No.: PCT/US2007/023513
§ 371 (c)(1),
(2), (4) Date: May 29, 2009

(87) PCT Pub. No.: WO2008/066677
PCT Pub. Date: Jun. 5, 2008

(65) Prior Publication Data
US 2010/0065393 A1 Mar. 18, 2010

Related U.S. Application Data

(60) Provisional application No. 60/872,069, filed on Nov. 30, 2006.

(51) Int. Cl.
*F16D 7/02* (2006.01)
*F16H 57/00* (2012.01)

(52) U.S. Cl. .............. 74/411; 192/56.6; 464/46; 464/48

(58) Field of Classification Search ................. 192/56.6; 464/46, 48
See application file for complete search history.

(56) References Cited

U.S. PATENT DOCUMENTS

| 4,569,250 | A | * | 2/1986 | Nellums | 74/650 |
| 5,002,517 | A | * | 3/1991 | Heidenreich et al. | 464/48 |
| 5,129,497 | A | * | 7/1992 | Kelley | 464/10 |
| 2003/0029688 | A1 | | 2/2003 | Lovatti | |
| 2004/0188213 | A1 | | 9/2004 | Pennycuff | |
| 2009/0301836 | A1 | * | 12/2009 | Murakami | 192/56.62 |

FOREIGN PATENT DOCUMENTS
GB 2251465 A 7/1992
* cited by examiner

*Primary Examiner* — David D Le
*Assistant Examiner* — Lillian Nguyen
(74) *Attorney, Agent, or Firm* — Harness, Dickey & Pierce, P.L.C.

(57) ABSTRACT

A driveline component with a first drive member, which is rotatable about an axis, a second drive member and a clutch. The second drive member has a hub, which is supported on the first drive member for rotation about the axis, and a transmission portion. The transmission portion, which is configured to engage a flexible power transmitting member, is disposed about the hub and aligned to a transmission axis that is generally perpendicular to the axis. The clutch has a spring and a set of interleaved clutch plates having portions that are coupled for rotation with a respective one of the first drive member and the second drive member. The spring generates a force that is transmitted through the hub such that the clutch plates frictionally engage one another. The location of the transmission portion relative to the transmission axis is unaffected by wearing of the set of clutch plates.

16 Claims, 6 Drawing Sheets

TORQUE LIMITING SHAFT AND SPROCKET ASSEMBLY

CROSS-REFERENCE TO RELATED APPLICATIONS

This application is a National Stage of International Application No. PCT/US2007/023513, filed Nov. 8, 2007, which claims the benefit of U.S. provisional application No. 60/872,069, filed Nov. 30, 2006.

The present disclosure generally relates to vehicle drivelines and more particularly to a torque limiting shaft and sprocket assembly for limiting the transmission of drive torque in a vehicle driveline.

The drive torque provided through a vehicle drive line can vary widely based upon various vehicle and road conditions. In a conventional vehicle drive line, it is possible for the drive line to experience peaks in the transmission of drive torque that exceed two or three times the vehicle skid torque (also known as the vehicle slip torque). As will be appreciated, the use of components that are designed to handle two or three times the vehicle skid torque is disadvantageous in that these components (and therefore the vehicle) tend be more costly and heavy. Given that a vehicle's fuel economy is related to its weight, the weight of the vehicle drive line can be of particular significance.

SUMMARY

In one form, the present teachings provide a driveline component for an automotive drivetrain. The driveline component includes a housing, a first drive member, a second drive member and a friction clutch. The first drive member is supported for rotation within the housing about a rotational axis. The second drive member has a hub and a power transmitting portion. The hub is supported on the first drive member for rotation about the rotational axis. The power transmitting portion is disposed about the hub and aligned to a power transmitting axis that is generally perpendicular to the rotational axis. The power transmitting portion is configured to engage a flexible power transmitting member. The friction clutch has a plurality of first clutch plates, a plurality of second clutch plates and a biasing spring. The first clutch plates are coupled for rotation with the first drive member. The second clutch plates are coupled for rotation with the second drive member and are interleaved with the first clutch plates. The biasing spring generates a biasing force that is transmitted through the hub such that the first and second clutch plates frictionally engage one another. A location of the power transmitting portion relative to the power transmitting axis is unaffected by wearing of the first and second clutch plates.

In another form, the present teachings provide a driveline component for an automotive drivetrain that includes a housing, a first drive member, a plate member, a second drive member and a friction clutch. The first drive member is supported for rotation within the housing about a rotational axis. The plate member is disposed about the first drive member. The second drive member has a hub, which is supported for rotation on the first drive member for rotation about the rotational axis, and a power transmitting portion that is disposed about the hub and aligned to a power transmitting axis that is generally perpendicular to the rotational axis. The power transmitting portion is configured to engage a flexible power transmitting member. The friction clutch has a plurality of first clutch plates, which are coupled for rotation with the first drive member, a plurality of second clutch plates, which are coupled for rotation with the second drive member and interleaved with the first clutch plates, and a biasing spring. The biasing spring generates a biasing force that is transmitted to the hub to cause the first and second clutch plates to frictionally engage one another. The hub axially abuts one the first drive member and the plate member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
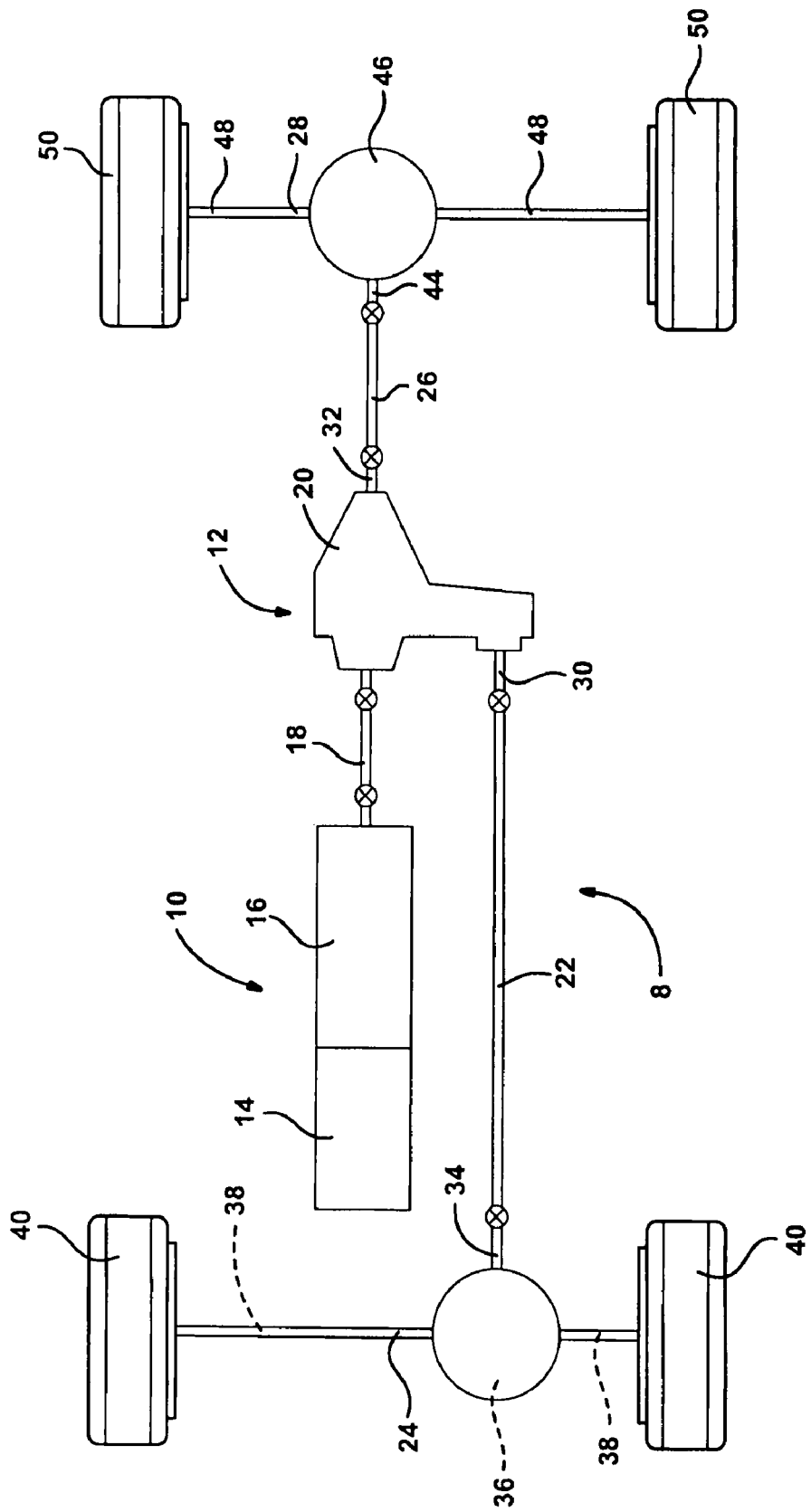
FIG. 1 is a schematic illustration of an exemplary vehicle having a driveline component, such as a transfer case, constructed in accordance with the teachings of the present disclosure.

With reference to FIG. 1 of the drawings, an exemplary vehicle 8 can include a powertrain 10 and a drivetrain 12. The powertrain 10 can include a source of rotary tractive power (i.e., drive torque), such as an internal combustion engine 14, and a transmission 16. The powertrain 10 can produce drive torque and transmit the drive torque to the drivetrain 12 for driving one or more sets of vehicle wheels. The drivetrain 12 can include an intermediate propeller shaft 18, a transfer case 20, a front propeller shaft 22, a front axle assembly 24, a rear propeller shaft 26, and a rear axle assembly 28.

As will be appreciated, the intermediate propeller shaft 18 can transmit drive torque from the transmission 18 to the transfer case 20. The transfer case 20 transmit the drive torque to one or both of the front propeller shaft 22 and the rear propeller shaft 26 via front and rear output shaft assemblies 30 and 32, respectively. The front axle assembly 24 can include a front axle input 34, a front differential 36, which is driven by the front axle input 34, and a pair of front axle shafts 38 that are driven by the front differential 36 and rotatably coupled to a front set of vehicle wheels 40. The front propeller shaft 22 can transmit rotary power between the front output shaft assembly 30 and the front axle input 34. The rear axle assembly 28 can include a rear axle input 44, a rear differential 46, which is driven by the rear axle input 44, and a pair of rear axle shafts 48 that are driven by the rear differential 46 and rotatably coupled to a set of rear vehicle wheels 50. The rear propeller shaft 26 can transmit rotary power between the rear output shaft assembly 32 and the rear axle input 44.

Figure 2:
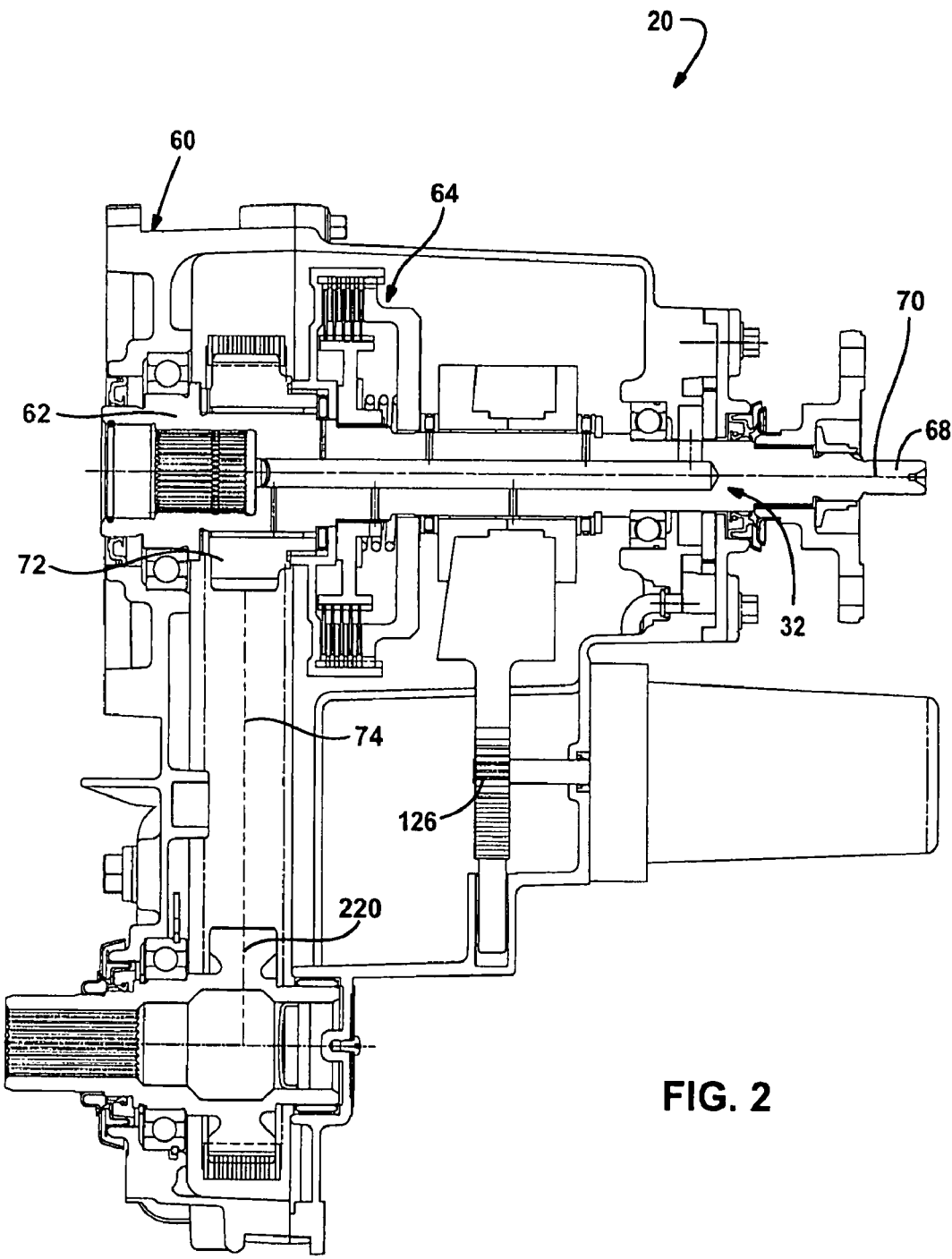
FIG. 2 is a longitudinal section view of a portion of the vehicle of FIG. 1 illustrating the transfer case in more detail.

With reference to FIG. 2, the transfer case 20 can be any type of transfer case, such as an electronically-controlled transfer case that permits a vehicle operator to select between a two-wheel drive mode, a locked ("part-time") four-wheel drive mode, and an adaptive ("on-demand") four-wheel drive mode. Except as otherwise described herein, the transfer case 20 can be configured in a conventional manner and can include a housing 60, an input shaft 62, the front output shaft assembly 30, the rear output shaft assembly 32 and a transfer clutch 64. An example of one such suitable transfer case is disclosed in U.S. Pat. No. 6,766,889, the disclosure of which is hereby incorporated by reference as if fully set forth in detail herein. Briefly, the housing 60 defines a cavity (not specifically shown) into which the input shaft 62, the front output shaft assembly 30 and the rear output shaft assembly 32 are rotatably received. The input shaft 62 and the front output shaft assembly 30 can extend from a first side of the housing 60, while the rear output shaft assembly 32 can extend from an opposite side of the housing 60. The input shaft 62 of the transfer case 20 can be coupled to the intermediate propeller shaft 18 (FIG. 1) to receive rotary power from the powertrain 10 (FIG. 1). The transfer clutch 64 can be selectively actuated for transferring drive torque from the rear output shaft assembly 32 to the front output shaft assembly 30 for establishing the part-time and on-demand four-wheel drive modes. The rear output shaft assembly 34 can be disposed about a first rotary axis 70 and can include a first sprocket 72 that can be disposed about a transmission axis 74 that can be generally perpendicular to the first rotary axis 70.

Figure 3:
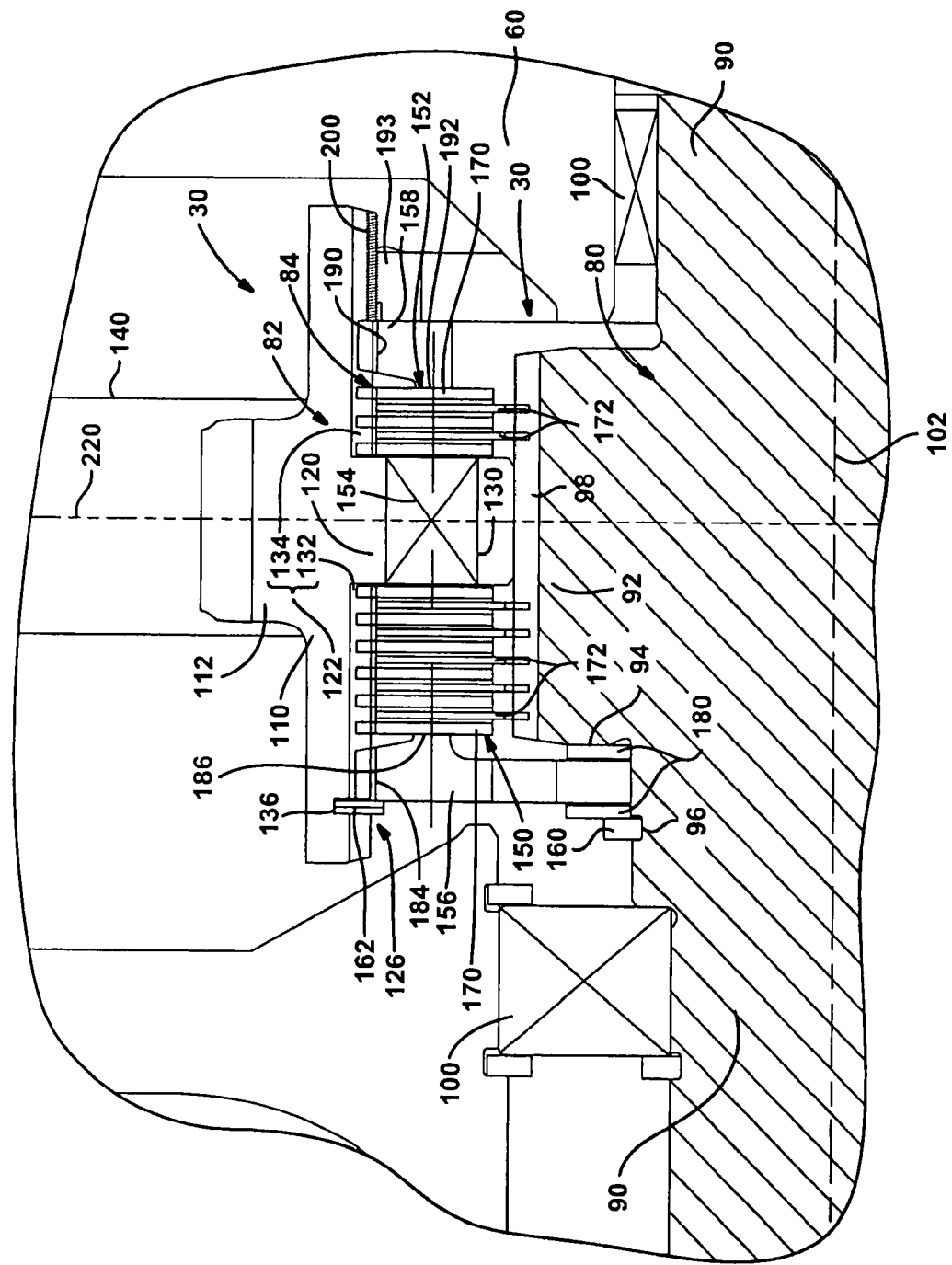
FIG. 3 is an enlarged portion of FIG. 2 illustrating the front output shaft assembly in greater detail.

With additional reference to FIG. 3, the front output shaft assembly 30 can include a first drive member 80, a second drive member 82 and a friction clutch 84. The first drive member 80 can be a shaft-like structure having journals 90, a first coupling portion 92, a shoulder 94, and a retaining ring groove 96 that can be disposed on a side of the shoulder 94 opposite the first coupling portion 92. The first coupling portion 92 can include a plurality of longitudinally-extending splines or teeth 98. A pair of bearings 100 can be coupled to the housing 60 of the transfer case 20 and can support the journals 90 such that the first drive member 80 is rotatable about a second rotary axis 102 that is generally parallel to the first rotary axis 70. The first drive member 80 can extend from a front side of the housing 60 and can be coupled to the front propeller shaft 22 (FIG. 1) in a conventional manner.

The second drive member 82 can include a hub 110 and a power transmitting portion 112. The hub 110 can include a body portion 120 and a second coupling portion 122. The body portion 120 can have an annular shape that can define a central bore 126. The central bore 126 can be sized to receive the first coupling portion 92 such that the hub 110 can rotate on the first coupling portion 92 about the second rotary axis 102. A plurality of spring apertures 130 can be formed through the body portion 120 radially offset from (and parallel to) the axis of the central bore 126. The second coupling portion 122 can include first and second sets of longitudinally extending splines or teeth 132 and 134, respectively, that can be disposed on opposite sides of the body portion 120. A retaining ring groove 136 can be formed in the first set of longitudinally-extending splines 132.

The power transmitting portion 112 can be rotary fixed coupled to the hub 110 and can be employed in conjunction with a flexible power transmitting member, such as a belt or a drive chain, to facilitate the transfer of rotary power from the first sprocket 72 to the hub 110. In the particular example provided, the flexible power transmitting member is a drive chain 140 and the power transmitting portion 112 is a sprocket that is disposed radially in-line with the body portion 120.

The friction clutch 84 can include first and second sets of mating clutch plates 150 and 152, respectively, a plurality of clutch springs 154, first and second pressure plates 156 and 158, respectively, and first and second retaining rings 160 and 162, respectively. The first and second sets of mating clutch plates 150 and 152 can be generally similar but located on opposite sides of the body portion 120. As such, a discussion of the first set of mating clutch plates 150 will suffice for both.

The first set of mating clutch plates 150 can include a plurality of first clutch plates 170 and a plurality of second clutch plates 172 that can be interleaved between the first clutch plates 170. The first clutch plates 170 can be formed of an appropriate friction material and can include a splined or toothed outer diameter that can be received onto the first set of longitudinally-extending splines 132 to thereby non-rotatably but axially slidably couple the first clutch plates 170 to the hub 110. The second clutch plates 172 can also be formed of an appropriate friction material and can include a splined or toothed inner diameter that can receive the longitudinally-extending splines 98 of the first coupling portion 92 to thereby non-rotatably but axially slidably couple the second clutch plates 172 to the first drive member 80.

It will be appreciated that the second set of mating clutch plates 152 can also include a plurality of first clutch plates 170, which can be received onto the second set of longitudinally extending splines 134 to non-rotatably but axially slidably couple the first clutch plates 170 to the hub 110. It will be further appreciated that the second set of mating clutch plates 152 can also include a plurality of second clutch plates 172 which can receive the longitudinally-extending splines 98 of the first coupling portion 92 to thereby non-rotatably but axially slidably couple the second clutch plates 172 to the first drive member 80.

The clutch springs 154 can be received into the spring apertures 130 and can bias the first and second sets of mating clutch plates 150 and 152 away from one another. The clutch springs 154 can be any type and/or combination of springs and can include Belleville springs (spring washers), wave springs and/or helical compression springs. In the particular example provided, the clutch springs 154 are helical compression springs.

The first pressure plate 156 can be mounted on the first drive member 80 and can be abutted against the shoulder 94 on the first drive member 80. The first retaining ring 160 can be received in the retaining ring groove 96 to limit axial movement of the first pressure plate 156 relative to the shoulder 94. Optionally, thrust washers 180 can be disposed on the opposite sides of the first pressure plate 156 between the shoulder 94 and the first retaining ring 160.

In the particular example provided, the first pressure plate 156 includes a plurality of teeth 184 that meshingly engage the first set of longitudinally extending teeth 132. Accordingly, it will be appreciated that the first pressure plate 156 can be rotary fixed coupled to the hub 110 and rotatably mounted on the first drive member 80. The first pressure plate 156 can include a first pressure plate surface 186 that can be abutted against the first set of mating clutch plates 150. The second snap ring 162 can be received in the retaining ring groove 136 and can abut the first pressure plate 156 to retain the first pressure plate 156 relative to the hub 110.

The second pressure plate 158 can include a plurality of teeth 190, which can be engaged to the second set of longitudinally extending splines 134, and a second pressure plate surface 192 that can be abutted against the second set of mating clutch plates 152. It will be appreciated that the second pressure plate surface 192 can be indexed toward the first pressure plate surface 186 to preload the clutch springs 154 by a desired amount and that the second pressure plate 158 can be fixed to the hub 110 by an appropriate means, such as welding. In the example provided, an annular threaded plug 198 is threadably engaged to a set of internal threads 200 formed in the hub 110. It will be appreciated that axial displacement of the plug 198 causes a corresponding axial displacement of the second pressure plate 158.

It will be appreciated that it is desirable to align the power transmitting portion 112 to the axis 220 of the drive chain 140. As the first and second sets of mating clutch plates 150 and 152 are disposed on opposite sides of the body portion 120 and biased away from one another by the clutch springs 154, it will be appreciated that wear of the first and second clutch plates 170 and 172 of the first and second sets of mating clutch plates 150 and 152 will not affect the position of the body portion 120 relative to the axis 220. As such, the first and second sets of mating clutch plates 150 and 152 can wear without affecting the relative positioning between the power transmitting portion 112 and the axis 220.

Figure 4:
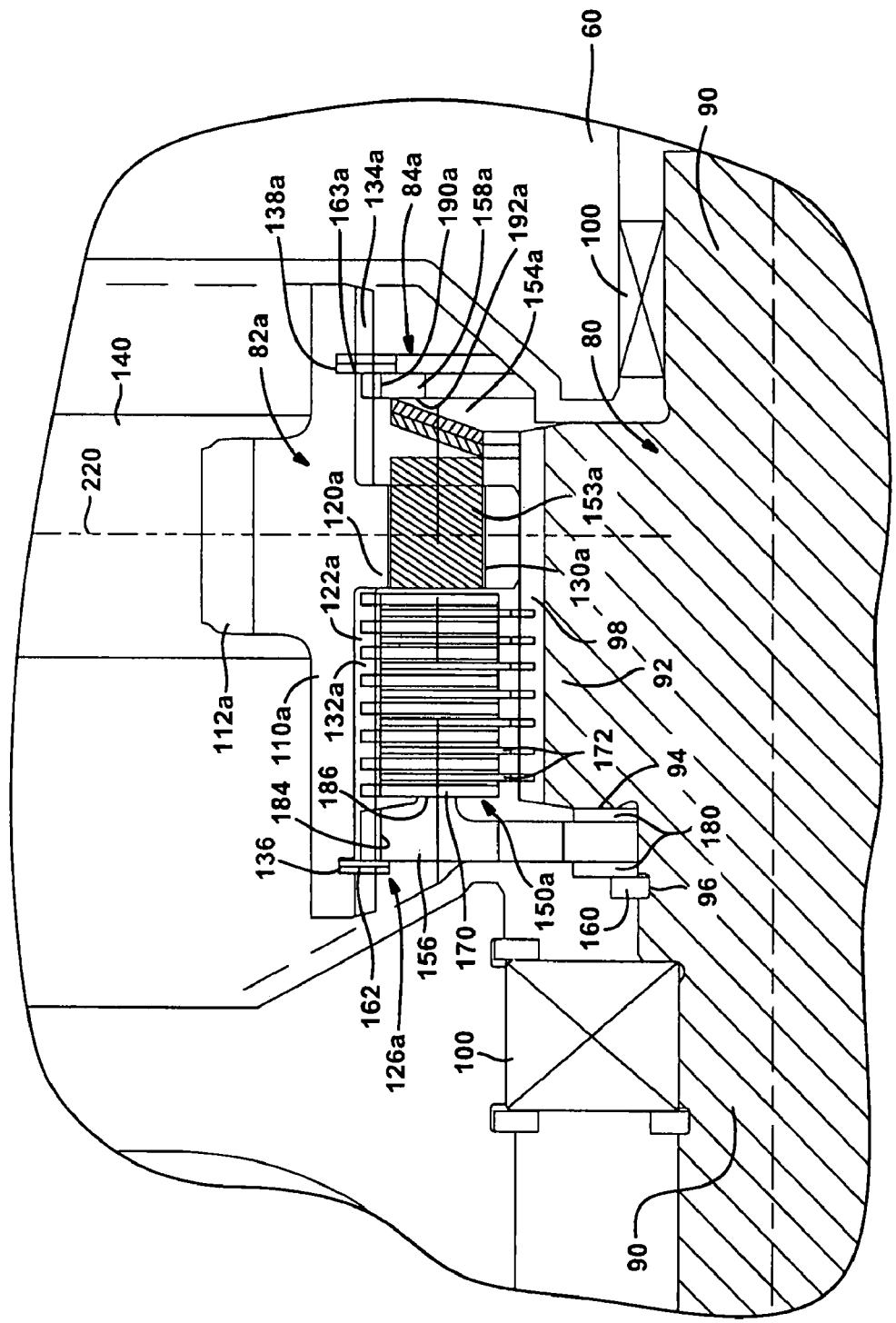
FIGS. 4-6 are views similar to that of FIG. 3 but illustrating portions of other transfer cases constructed in accordance with the teachings of the present disclosure.

While the front output shaft assembly 30 has been illustrated and described as having a friction clutch 84 with first and second sets of mating clutch plates 150 and 152, those skilled in the art will appreciate that the invention, in its broader aspects, may be constructed somewhat differently. For example, the transfer case may be constructed as shown in FIG. 4. In this arrangement, the front output shaft assembly 30a can include a first drive member 80, a second drive member 82a and a friction clutch 84a.

The second drive member 82' can include a hub 110a and a power transmitting portion 112a. The hub 110a can include a body portion 120a and a second coupling portion 122a. The body portion 120a can have an annular shape that can define a central bore 126a. The central bore 126a can be sized to receive the first coupling portion 92 such that the hub 110a can rotate on the first coupling portion 92 about the second rotary axis 102. A plurality of pin apertures 130a can be formed through the body portion 120a radially offset from (and parallel to) the axis of the central bore 126a. The second coupling portion 122a can include first and second sets of longitudinally extending splines or teeth 132a and 134a, respectively, that can be disposed on opposite sides of the body portion 120a. A retaining ring groove 136 can be formed in the first set of longitudinally-extending splines 132a.

The power transmitting portion 112a can be rotary fixed coupled to the hub 110a and can be employed in conjunction with a flexible power transmitting member, such as a drive chain 140, to facilitate the transfer of rotary power from the first sprocket (not specifically shown) to the hub 110a.

The friction clutch 84a can include a set of mating clutch plates 150a, a plurality of standoffs or clutch pins 153a, a clutch spring 154a, first and second pressure plates 156 and 158a, respectively, and first, second and third retaining rings 160, 162 and 163a, respectively. The set of mating clutch plates 150a can include a plurality of first clutch plates 170 and a plurality of second clutch plates 172 that can be interleaved between the first clutch plates 170. The first clutch plates 170 can be formed of an appropriate friction material and can include a splined or toothed outer diameter that can be received onto the first set of longitudinally-extending splines 132a to thereby non-rotatably but axially slidably couple the first clutch plates 170 to the hub 110a. The second clutch plates 172 can also be formed of an appropriate friction material and can include a splined or toothed inner diameter that can receive the longitudinally-extending splines 98 of the first coupling portion 92 to thereby non-rotatably but axially slidably couple the second clutch plates 172 to the first drive member 80.

The clutch pins 153a can be generally cylindrically shaped and can be received into the pin apertures 130a and extend from the opposite axial end faces of the body portion 120a. The clutch spring 154a can be received in the central bore 126a and can bias the clutch pins 153a toward the set of mating clutch plates 150a. The clutch spring 154 can be any type and/or combination of springs and can include Belleville springs, wave springs and/or helical compression springs. In the particular example provided, the clutch spring 154a is a pair of Belleville springs.

The first pressure plate 156 can be mounted on the first drive member 80 and can be abutted against the shoulder 94 on the first drive member 80. The first retaining ring 160 can be received in the retaining ring groove 96 to limit axial movement of the first pressure plate 156 relative to the shoulder 94. Optionally, thrust washers 180 can be disposed on the opposite sides of the first pressure plate 156 between the shoulder 94 and the first retaining ring 160. The thrust washers 180 can be sized to have a relatively uniform thickness or could be selected based on their thickness to achieve a desired preload on the clutch spring 154a. Also optionally, spacers or shims may be employed to control the preload on the clutch spring 154a. In addition, the first pressure plate 156 could be selected based on its thickness to achieve a desired preload on the clutch spring 154a. In the particular example provided, the first pressure plate 156 includes a plurality of teeth 184 that meshingly engage the first set of longitudinally extending teeth 132a. Accordingly, it will be appreciated that the first pressure plate 156 can be rotary fixed coupled to the hub 110a and rotatably mounted on the first drive member 80. The first pressure plate 156 can include a first pressure plate surface 186 that can be abutted against the set of mating clutch plates 150a.

The second pressure plate 158a can include a plurality of teeth 190a, which can be engaged to the second set of longitudinally extending splines 134a, and a second pressure plate surface 192a that can be abutted against the clutch spring 154a. It will be appreciated that the position of the second pressure plate surface 192a can be fixed relative to the hub 110a. In the example provided, the third snap ring 163a is received in a retaining ring groove 138a that is formed in the hub 110a.

It will be appreciated that it is desirable to align the power transmitting portion 112a to the axis 220 of the drive chain 140. When the set of clutch plates 150 wears, the clutch pins 153a will move through the pin apertures 130a toward the first pressure plate 156 due to the biasing force that is applied thereto by the clutch spring 154a. As such, the set of mating clutch plates 150a can wear without affecting the relative positioning between the power transmitting portion 112a and the axis 220.

Figure 5:
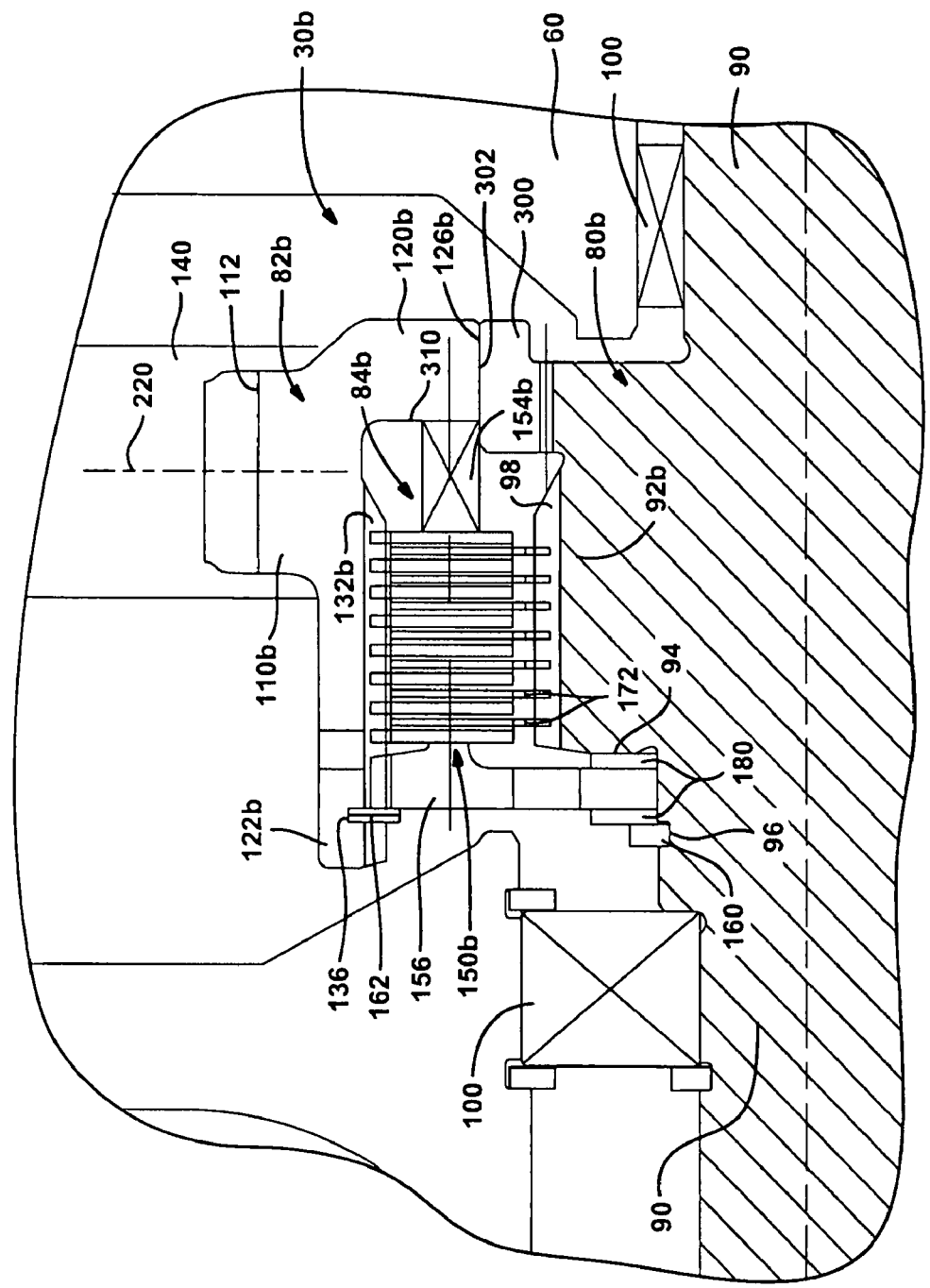

In the example of FIG. 5, the front output shaft assembly 30b can include a first drive member 80b, a second drive member 82b and a friction clutch 84b. The first drive member 80b can be generally similar to the first drive member 80 of FIG. 3 except that the first coupling portion 92b can include a first pilot portion 300 that can be disposed on a side of the longitudinally-extending splines 98 opposite the shoulder 94. The first pilot portion 300 can include a circumferentially-extending pilot surface 302.

The second drive member 82b can include a hub 110b and a power transmitting portion 112 that can be generally similar to the power transmitting portion 112 of FIG. 3. The hub 110b can include a body portion 120b and a second coupling portion 122b. The body portion 120b can have an annular shape that can define a central bore 126b. The central bore 126b can be sized to receive the first pilot portion 300 such that the hub 110b can rotate on the first coupling portion 92b about a second rotary axis 102. Optionally, a bearing (not shown) can be disposed between the first pilot portion 300 and the body portion 120b. The second coupling portion 122b can include a set of longitudinally-extending splines or teeth 132b. A retaining ring groove 136 can be formed in the set of longitudinally-extending splines 132b.

The friction clutch 84b can include a set of mating clutch plates 150b, a clutch spring 154b, a pressure plate 156 and a retaining ring 162. The set of mating clutch plates 150b can include a plurality of first clutch plates 170 and a plurality of second clutch plates 172 that can be interleaved between the first clutch plates 170. The first and second clutch plates 170 and 172 can be configured as described above in the discussion of FIG. 3 and can be non-rotatably but axially slidably engaged to the teeth 132b and 98, respectively, of the second coupling portion 122b and the first coupling portion 92b, respectively.

The clutch spring 154b can be disposed between the set of mating clutch plates 150b and a wall member 310 of the body portion 120b. The clutch spring 154b can be any type of spring but in the particular example provided, is a helical compression spring that can be fitted over and pilot on the first pilot portion 300.

The first pressure plate 156 can be mounted on the first drive member 80b and can be abutted against the shoulder 94 on the first drive member 80b. The first retaining ring 160 can be received in the retaining ring groove 96 to limit axial movement of the first pressure plate 156 relative to the shoulder 94. Optionally, thrust washers 180 can be disposed on the opposite sides of the first pressure plate 156 between the shoulder 94 and the first retaining ring 160.

In the particular example provided, the first pressure plate 156 includes a plurality of teeth 184 that meshingly engage the set of longitudinally extending teeth 132b. Accordingly, it will be appreciated that the first pressure plate 156 can be rotary fixed coupled to the hub 110b and rotatably mounted on the first drive member 80b. The first pressure plate 156 can include a first pressure plate surface 186 that can be abutted against the first set of mating clutch plates 150b. The second snap ring 162 can be received in the retaining ring groove 136 and can abut the first pressure plate 156 to retain the first pressure plate 156 relative to the hub 110b.

As the set of mating clutch plates 150b wear, the force exerted by the clutch spring 154b will move the set of mating clutch plates 150b toward the pressure plate 156 and will further maintain the body portion 120b (and thus the power transmitting portion 112) in a stationary position relative to the axis 220 of the drive chain 140.

Figure 6:
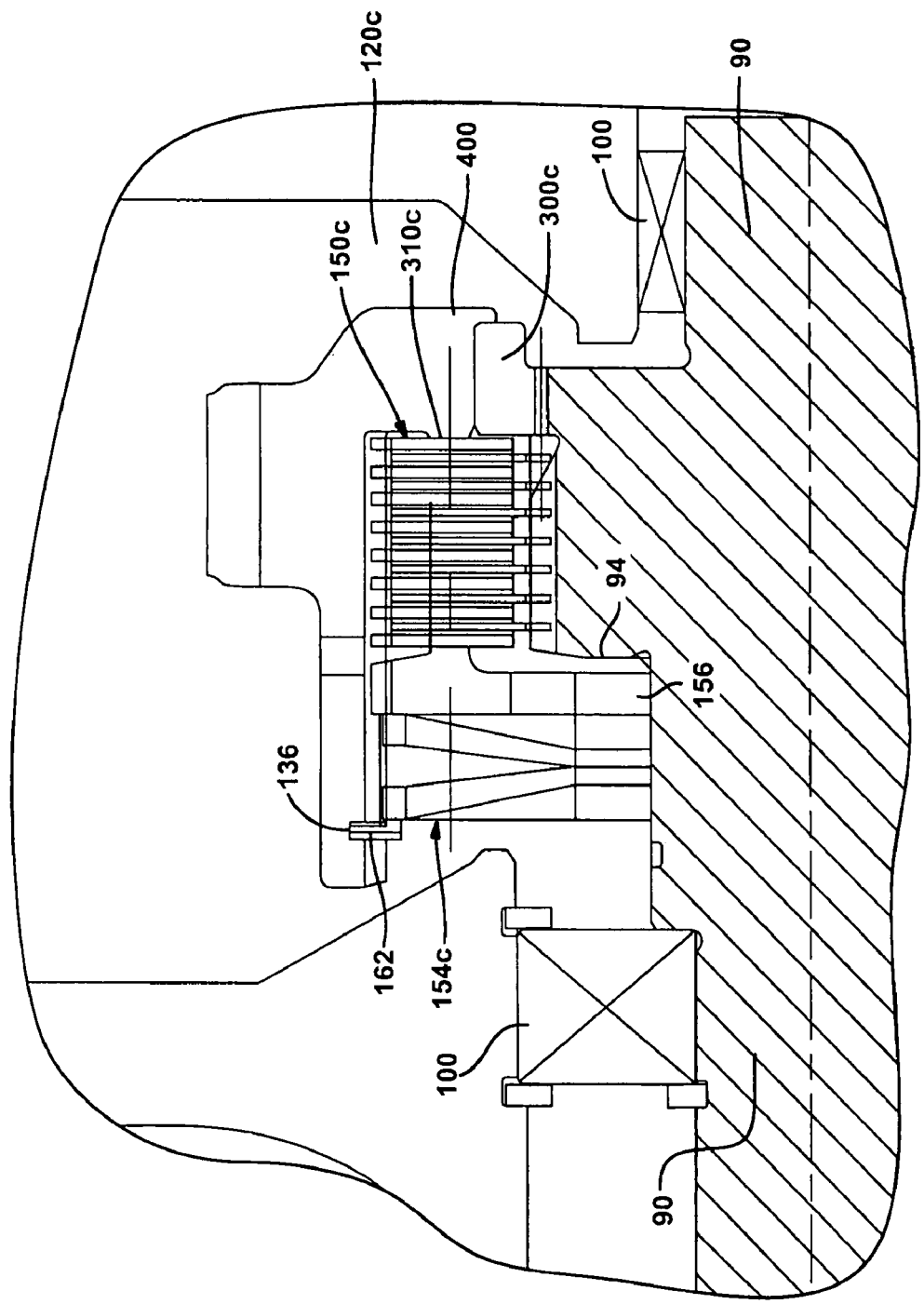

The example of FIG. 6 can be generally similar to that of FIG. 5, except that the clutch spring 154c can be disposed on a side of the pressure plate 156 opposite the set of mating clutch plates 150c and the body portion 120c can include a flange 400 that can abut the first pilot portion 300c on a side opposite the set of mating clutch plates 150c. The clutch spring 154c, which includes a plurality of Belleville springs in the example provided, can be captured between the retaining ring 162 and the pressure plate 156. The clutch spring 154c biases the pressure palter 156 into the set of mating clutch plates 150c, which engage the wall member 310c of the body portion 120c on a side opposite the pressure plate 156. Movement of the body portion 120c toward the clutch spring 154c can be checked by contact between the flange 400 and the first pilot portion 300c. It will be appreciated that as the set of mating clutch plates 150c wear, the pressure plate 156 will move in a direction toward the wall member 310c in response to the force exerted by the clutch spring 154c. It will be further appreciated that a gap may exist between the shoulder 94 and the pressure plate 156 to provide sufficient room for axial movement of the pressure plate 156 toward the shoulder 94.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A driveline component for an automotive drivetrain, the driveline component comprising:
    a housing:
    a first drive member supported for rotation within the housing about a rotational axis;
    a second drive member having a hub and a power transmitting portion, the hub being supported on the first drive member for rotation about the rotational axis, the power transmitting portion being disposed about the hub and aligned to a power transmitting axis that is generally perpendicular to the rotational axis, the power transmitting portion being configured to engage a flexible power transmitting member; and
    a friction clutch having a plurality of first clutch plates, a plurality of second clutch plates and a biasing spring, the first clutch plates being coupled for rotation with the first drive member, the second clutch plates being coupled for rotation with the second drive member and being interleaved with the first clutch plates, the biasing spring generating a biasing force that is transmitted through the hub such that the first and second clutch plates frictionally engage one another, wherein the friction clutch further comprises a plurality of standoffs that slidably extend through the hub, the standoffs being disposed between the first and second clutch plates and the biasing spring;
    wherein a location of the power transmitting portion relative to the power transmitting axis is unaffected by wearing of the first and second clutch plates.

2. The driveline component of claim 1, wherein the biasing spring comprises a plurality of spring elements, each of the spring elements being housed in the hub.

3. The driveline component of claim 2, wherein the hub includes a plurality of in apertures, wherein the plurality of standoffs includes clutch pins disposed for sliding movement within the in apertures, and wherein the spring elements bias the clutch pins toward the interleaved first and second clutch plates.

4. The driveline component of claim 2, wherein each spring element comprises a coil spring, a wave spring or a Belleville washer.

5. The driveline component of claim 1, wherein the second drive member is a sprocket.

6. The driveline component of claim 1, wherein the biasing spring is housed in the hub.

7. The driveline component of claim 6, wherein the standoffs are disposed in apertures extending through the hub, and wherein the biasing spring acts on the standoffs to bias the standoffs into engagement with the interleaved first and second clutch plates.

8. The driveline component of claim 6, wherein the biasing spring comprises a coil spring, a wave spring or a Belleville washer.

9. A driveline component for an automotive drivetrain, the driveline component comprising:
   a housing:
   a first drive member supported for rotation within the housing about a rotational axis;
   a second drive member having a hub and a power transmitting portion, the hub being supported for rotation on the first drive member for rotation about the rotational axis, the hub including a radially inwardly extending body portion generally surrounding a portion of the first drive member and having an axially extending aperture formed therethrough, the power transmitting portion being disposed about the hub and aligned to a power transmitting axis that is generally perpendicular to the rotational axis, the power transmitting portion being configured to engage a flexible power transmitting member; and
   a friction clutch having a plurality of first clutch plates, a plurality of second clutch plates and a biasing spring, the first clutch plates being coupled for rotation with the first drive member, the second clutch plates being coupled for rotation with the second drive member and being interleaved with the first clutch plates, and the biasing spring is disposed in the aperture extending through the body portion of the hub, the biasing spring generating a biasing force that is transmitted through the hub to cause the first and second clutch plates to frictionally engage one another.

10. The driveline component of claim 9, wherein the first and second clutch plates are arranged to define a first set of mating clutch plates and a second set of mating clutch plates, wherein the first set of mating clutch plates is located on one side of the body portion and the second set of mating clutch plates is located on an opposite side of the body portion, and wherein the biasing spring is disposed between the first and second sets of mating clutch plates.

11. The driveline component of claim 9, wherein the biasing spring is disposed on one side of one of the first or second set of mating clutch plates, and wherein a pressure plate is disposed on the opposite side of said one of the first or second set of mating clutch plates.

12. The driveline component of claim 9, wherein the biasing spring comprises a coil spring.

13. The driveline component of claim 9, wherein the second drive member is a sprocket.

14. A driveline component for an automotive drivetrain, the driveline component comprising:
   a housing:
   a shaft;
   a plurality of first clutch plates non-rotatably coupled to the shaft;
   a sprocket having a hub portion that is disposed about the shaft and defining a plurality of axially extending apertures that are formed therethrough;
   a plurality of biasing springs, each of the biasing springs being disposed in a corresponding one of the axially extending apertures; and
   a plurality of second clutch plates non-rotatably coupled to the sprocket, the second clutch plates being interleaved with the first clutch plates, wherein a first portion of the second clutch plates are disposed on a first side of the hub portion and a second portion of the second clutch plates are disposed on a second side of the hub portion opposite the first side, wherein the springs simultaneously apply loads to the clutch plates on opposite sides of the hub portion to cause frictional engagement between the first and second clutch plates.

15. The driveline component of claim 14, wherein each of the springs extends at a radial position aligned with the first and second clutch plates.

16. The driveline component of claim 14, wherein the biasing springs comprise coil springs, wave springs or Belleville washers.

* * * * *